United States Patent
Norman et al.

[11] 3,777,487
[45] Dec. 11, 1973

[54] METHOD AND APPARATUS FOR REACTION PROPULSION

[75] Inventors: Leslie W. Norman, Scottsdale; Skillman C. Hunter, Phoenix, both of Ariz.

[73] Assignee: The Garrett Corporation, Los Angeles, Calif.

[22] Filed: Feb. 9, 1961

[21] Appl. No.: 88,149

[52] U.S. Cl. ........................ 60/204, 60/270, 60/244
[51] Int. Cl. .......................... F02k 7/10, F02k 3/02
[58] Field of Search .................... 60/35.6, 35.6 RJ

[56] References Cited
UNITED STATES PATENTS

| | | | |
|---|---|---|---|
| 2,911,787 | 11/1959 | Barry | 60/35.6 |
| 2,990,142 | 6/1961 | Ferri | 60/35.6 |
| 2,763,426 | 9/1956 | Erwin | 60/35.6 |
| 2,971,330 | 2/1961 | Clark | 60/35.6 |
| 3,023,571 | 3/1962 | Pietrangeli et al. | 60/35.6 |
| 3,040,516 | 6/1962 | Brees | 60/35.6 |
| 3,054,255 | 9/1962 | Stratford | 60/35.6 |

OTHER PUBLICATIONS

"Recent Advances in Ramjet Combustion" by Gordon L. Dugger, ARS Journal, Nov. 1959, pp. 819-827.

*Primary Examiner*—Robert F. Stahl
*Attorney*—John H. G. Wallace and Herschel C. Omohundro

EXEMPLARY CLAIM

6. A method for developing propulsive reaction at air speeds in excess of sonic velocity comprising: directing an air flow into a confined channel; mixing fuel with said air flow ; exciting successive oblique shock waves in said channel to decrease the Mach number and increase the static pressure and static temperature of the flow therein; removing boundary layer air from the channel walls adjacent the terminal ends of certain of the oblique shock waves; and exciting a shock wave substantially normal to the axis of said flow at a fixed position in said channel to induce detonation of said fuel-air mixture.

7 Claims, 4 Drawing Figures

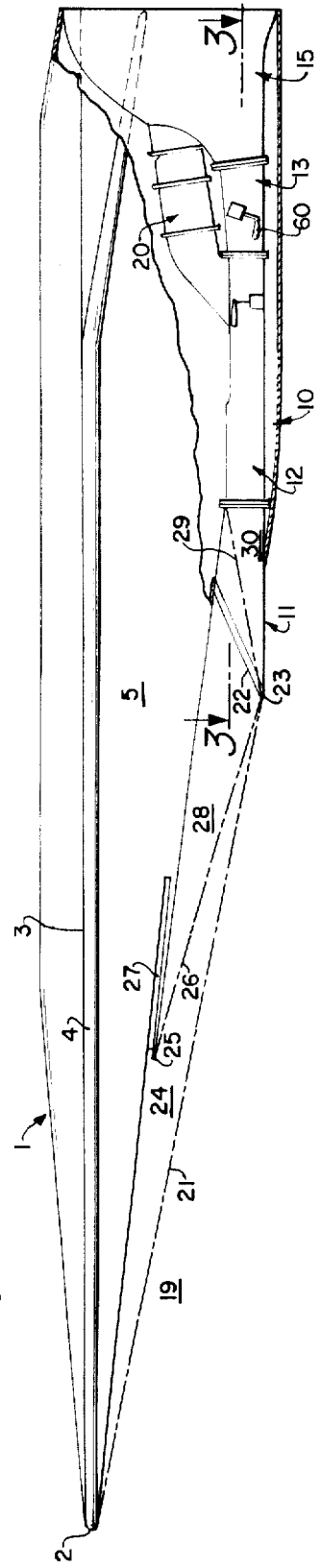
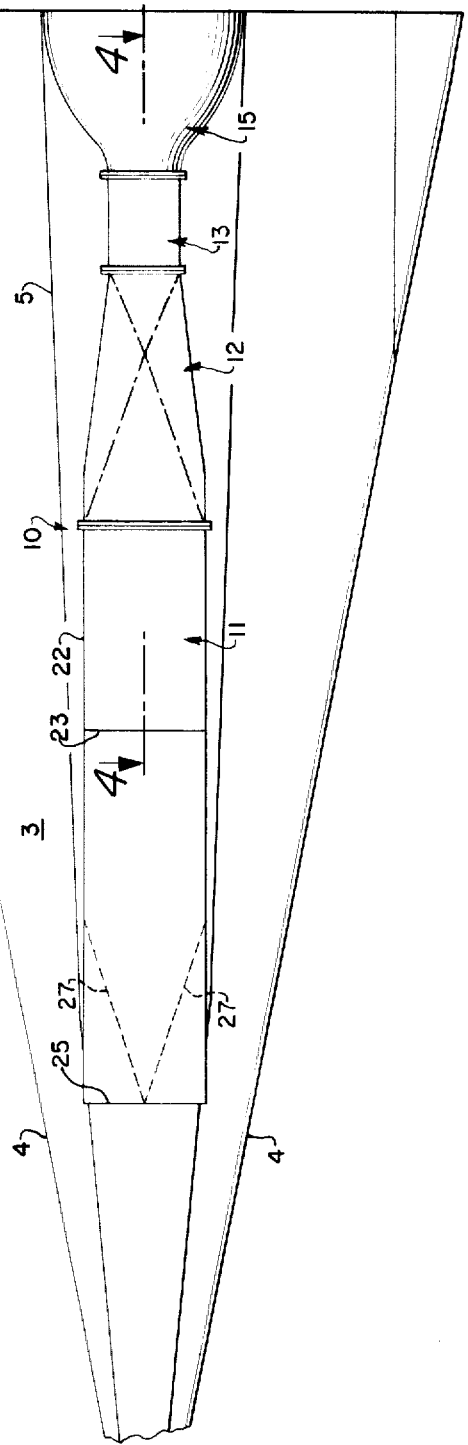

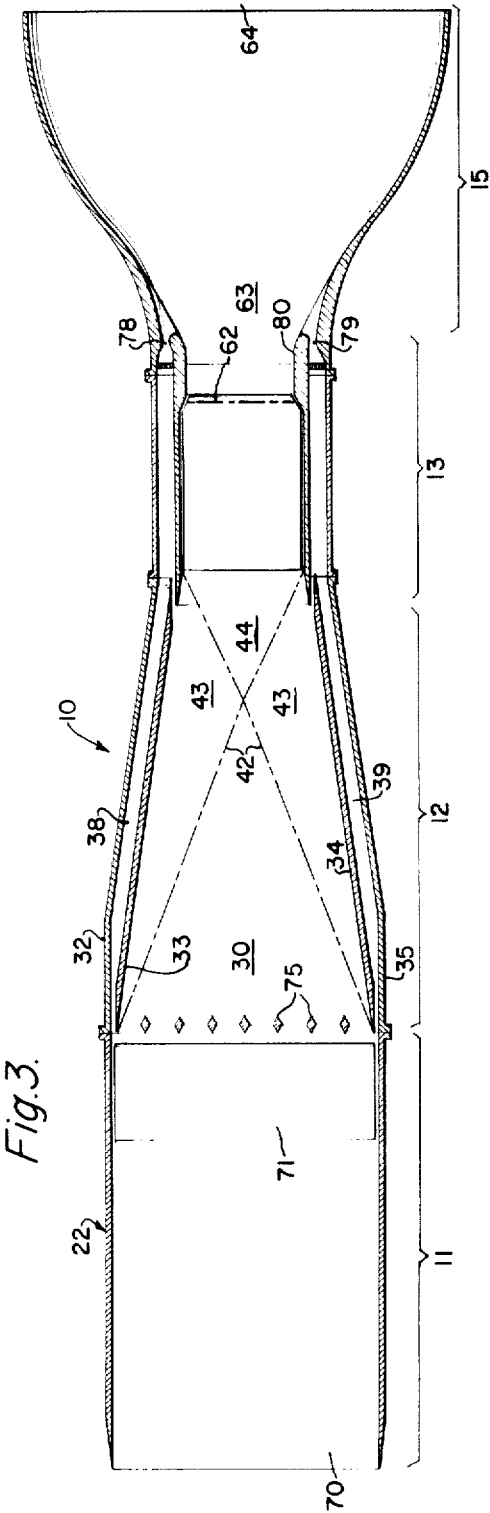
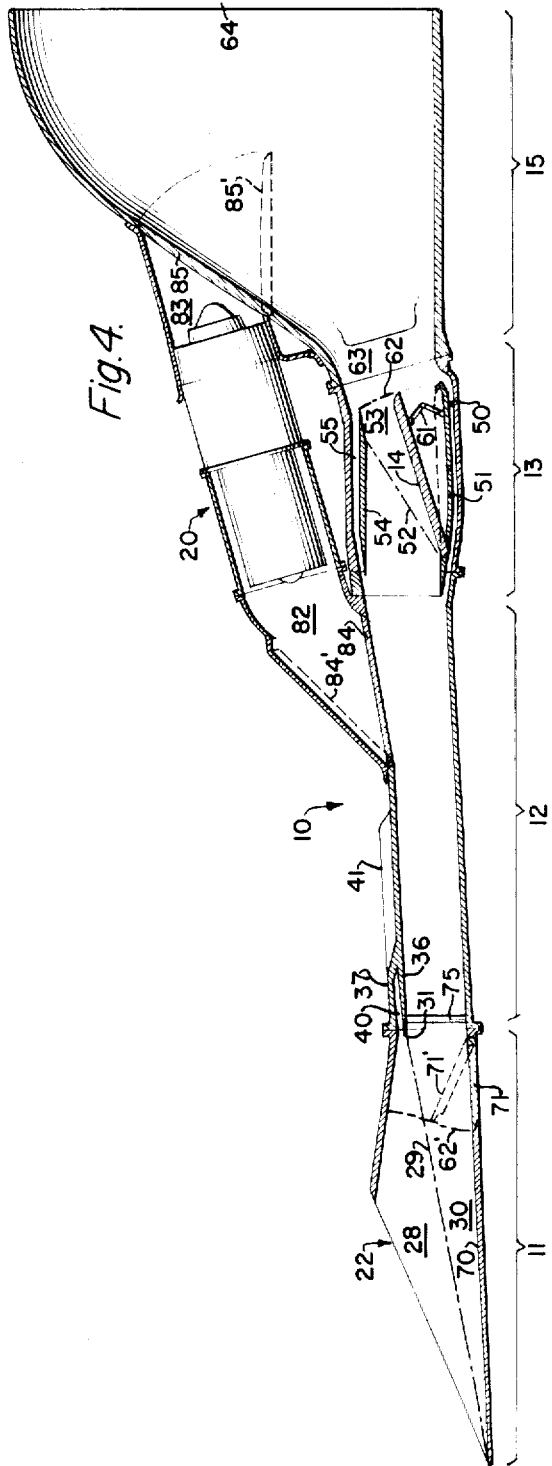

METHOD AND APPARATUS FOR REACTION PROPULSION

The present invention relates to a reaction propulsion method and apparatus for operation under conditions of relative airflow exceeding the local propagational speed of sound and, more particularly, to a propulsive aerothermodynamic duct wherein combustion of a fuel-air mixture is established and maintained by novel aerodynamic means.

In propulsive aerothermodynamic ducts as known in the prior art, ambient air is induced into the inlet portion of a duct, preferably at a relative flow velocity exceeding the local propagational speed of sound, and subsequently decelerated through a normal shock wave to subsonic velocity in a diffuser of appropriate internal contour. (In the interest of brevity, speeds relative to the local propagational speed of sound or so-called "sonic velocity", will hereinafter be identified according to the conventional notation of the art in terms of Mach number, $M = v/c$, wherein $v$ is the flow velocity under consideration and $c$ is the local propagational speed of sound at the prevailing conditions of air temperature). The subsonic air flow is then further decelerated to a speed compatible with the establishment and maintenance of a normal combustion process, for example, to a velocity in the region of $M = 0.2$ to $M = 0.5$, and fuel, introduced thereto by means of suitable injection nozzles, is ignited by appropriate means such as an electric spark device, the resulting flame being stabilized and maintained in a fixed position relative to the duct by means of a flameholder generally taking the form of a grid or similar structure mounted transversely to the duct axis. The gaseous combustion product is then expanded through a convergent-divergent nozzle so as to produce a net forward thrust and is expelled to the ambient atmosphere via an exhaust orifice. With the exception of the so-called pulse jet, which depends for its operation on a cyclically operating valve cooperative with a duct tuned to the natural frequency thereof, aerothermodynamic ducts of the prior art, generally known as ram jets, conform broadly to the described operating cycle, numerous refinements and variations in the design details thereof having been developed by those skilled in the art.

The present invention comprehends a novel aerothermodynamic duct utilizing a mode of fuel oxidation differing from the normal combustion process and operating independently of auxiliary flameholding or ignition structures as taught in the prior art. Briefly, the invention depends for its operation on the combustion process generally referred to as detonation; that is, a process wherein the flame front is established and maintained by the temperature rise occurring across a shock wave, rather than being advanced by heat conduction as is the case in conventional internal combustion processes such as occur in ram jet as well as turbojet engines and in reciprocating engines operating on the Otto cycle. Whereas detonation as normally considered in connection with an Otto cycle engine, for example, is a spacially mobile and temporally transient phenomenon of extremely short duration, in the present invention a continuous, steady state detonation is established and maintained across a standing shock wave of fixed position relative to a confining structure therefor, subsequent expansion of the gaseous detonation product being used to develop a continuous thrust.

It is an object of the present invention, therefore, to provide an aerothermodynamic duct wherein propulsive force or thrust is developed by continuous detonation of a fuel-air mixture.

It is another object of the invention to provide an aerothermodynamic duct wherein combustion of a fuel-air mixture takes place across a shock wave of substantially fixed position relative to the adjacent structure.

It is another object of the invention to provide an aerothermodynamic duct wherein combustion of a fuel-air mixture takes place in consequence of the temperature rise across a shock wave.

It is another object of the invention to provide an aerothermodynamic duct wherein combustion of a fuel-air mixture is initiated by aerodynamic means independently of auxiliary igniter means.

It is another object of the invention to provide an aerothermodynamic duct wherein combustion of a fuel-air mixture is maintained by aerodynamic means independently of an auxiliary flame holding structure.

It is another object of the invention to provide an aerothermodynamic duct wherein fuel may be introduced into the air stream substantially upsteam from the locus of combustion.

It is another object of the invention to provide an aerothermodynamic duct for continuous detonation of a mixture of air and gaseous fuel.

It is another object of the invention to provide an aerothermodynamic duct for continuous detonation of a mixture of air and fuel, wherein said fuel is hydrogen.

It is another object of the invention to provide an aerothermodynamic duct incorporating means for the excitation of relatively stationary shock waves internally thereof, thereby to provide sufficient temperature rise to initiate and maintain continuous detonation of a fuel-air mixture.

It is another object of the invention to provide an aerothermodynamic duct wherein continuous detonation of a fuel-air mixture may be accomplished by means of a system of interrelated shock waves that may be partially external to the confining walls of the duct.

Still further objects of the invention will be made apparent in the following portions of this specification which, taken in conjunction with the appended drawings, are particularly descriptive of an exemplary embodiment thereof.

In the drawings, which are merely illustrative and not to be construed by way of limitation, and in which like elements are denoted by like reference numerals, FIG. 1 is a side elevation, partially broken away, of an aircraft incorporating a propulsive engine according to the present invention;

FIG. 2 is a bottom plan view of the aircraft shown in FIG. 1;

FIG. 3 is a sectional plan view on an enlarged scale taken along the line 3—3 of FIG. 1 showing certain internal features of the propulsive engine; and FIG. 4 is a sectional elevation on the same scale as FIG. 3 and taken along the line 4—4 of FIG. 2.

In the drawing, an aircraft 1 of a type adapted for flight at so-called hypersonic Mach numbers, for example, in the region of $M = 6$, is shown as having an acutely tapered nose portion 2, an aerodynamic sustaining surface or wing 3 having sharply swept leading edges 4 and a body or fuselage 5, the lower portion of the latter housing a propulsive engine 10, according to the present invention, it being understood, however, that the general configuration of the aircraft 1 forms no part of the invention except insofar as it is adapted to co-operate with engine 10 in a manner to be more particularly described hereinafter.

As is more clearly shown in FIGS. 3 and 4, the engine 10 comprises an elongated duct having an intake portion 11, an intermediate portion 12 adapted to excite and contain a system of shock waves in a manner to be described hereinafter, a combustion portion 13 including a hingedly adjustable ramp 14, and an exhaust nozzle 15. Associated with the engine 10 is a second engine 20, which may, for example, be a turbo-jet of known type, the purpose and operation of which will be made apparent hereinafter.

As previously discussed, the propulsive engine 10, which is an aerothermodynamic duct, depends for its operation on the continuous detonation of a fuel-air mixture due to the temperature rise across a standing shock wave, the latter preferably being a normal shock wave though not necessarily limited thereto, the shock wave across which the detonation takes place in the embodiment shown in the drawings being indicated by the dashed line 62. The structural elements and aerodynamic phenomena leading to the development and determining the location of this shock wave will now be described with particular reference to the combination of vehicle and motor illustrated, the aerodynamic phenomena being described for exemplary purposes only with reference to a free stream Mach number of 6.5 at an altitude of 125,000 feet, it being understood, however, that where steady state operation under different ambient conditions is desired appropriate modifications to particular features of the design may be made in accordance with aerodynamic principles well known to those skilled in the art.

Referring to FIG. 1, the dashed line 21 indicates an oblique shock wave originating at the nose 2 and extending rearwardly therefrom at an angle determined by the free stream Mach number, the intake portion 11 of the motor 10 being provided with a forwardly raked induction scoop 22 having a leading edge 23 positioned so as to intersect the shock wave 21 as shown. As is well known to those skilled in the art, the Mach number characterizing the flow in the region designated by the numeral 24 behind the shock wave 21 will be somewhat lower than the free stream value of 6.5 previously stated, this decrease in Mach number being accompanied by a rise in static pressure and a similar rise in static temperature; for convenient reference throughout the following discussion, the values of pressure, temperature, Mach number and velocity prevailing in the various flow regions shown in the drawing are tabulated below:

TABLE I

| Region | Total pressure, p.s.i.a. | Static pressure, p.s.i.a. | Total temp. (° R.) | Static temp. (° R.) | Mach No. (M) | Velocity (f.p.s.) |
| --- | --- | --- | --- | --- | --- | --- |
| 19 | 191.2 | .0541 | 3,850 | 460 | 6.50 | 6,820 |
| 24 | 187.4 | .0943 | 3,850 | 542 | 5.88 | 6,870 |
| 28 | 186.8 | .1444 | 3,850 | 614 | 5.52 | 7,240 |
| 30 | 155.8 | .6250 | 3,850 | 975 | 4.18 | 6,450 |
| 43 | 150.7 | 1.3263 | 3,850 | 1,208 | 3.64 | 6,200 |
| 44 | 147.5 | 2.5069 | 3,850 | 1,437 | 3.24 | 6,030 |
| 53 | 132.6 | 7.3470 | 3,850 | 1,820 | 2.50 | 5,400 |
| 63 | 54.4 | 36.8 | 5,385 | 4,950 | 0.801 | 2,760 |
| 64 | 53.4 | .0677 | 5,385 | 1,070 | 5.0 | 8,335 |

In accordance with the reduced Mach number prevailing in region 24, the aircraft fuselage 5 is provided with a ramp 25 having a sharp leading edge positioned transversely of the relative flow so as to generate a second oblique shock wave 26 extending rearwardly therefrom to intersect with shock wave 21 at the leading edge 23 of induction scoop 22, the ramp 25 preferably being provided with boundary layer diversion slots 27 of known type in order to minimize the deflection of turbulent flow into the region 28 behind shock wave 26. Referring to Table I, it will be seen that the Mach number prevailing in region 28 has been still further reduced and that the static pressure, and static temperature have been correspondingly increased, the total temperature remaining unchanged since the aerodynamic process characterizing the shock wave 26 is adiabatic.

In consequence of the deflection of the air flow at leading edge 23, a third oblique shock wave 29 extends rearwardly therefrom into intake porton 11, the pressure, temperature and Mach number prevailing in region 30 behind shock wave 29 being further changed as indicated in Table I. As shown in FIG. 4, shock wave 29 intersects the entrance to intermediate duct portion 12 adjacent the leading edge 31 of a second boundary layer diversion structure comprising wall members 32 and 33, 34 and 35, and 36 and 37 defining diversionary passages 38, 39 and 40, respectively, the last named preferably being of bifurcated construction so as to merge with passages 38 and 39, as through symmetrically disposed transition passages 41. The intermediate duct portion 12 extends rearwardly with substantially constant vertical dimension but tapers in the horizontal plane as shown in FIG. 3, thereby tending to establish and maintain a symmetrically disposed pair of oblique shock waves 42 defining flow regions 43 and intersecting with each other in mutually reinforcing manner so as to define another flow region 44 characterized by temperatures, pressures and Mach number as shown in Table I. As the flow in region 44 encounters the discontinuity of wall contour occurring at the leading edge of hingedly mounted ramp 14 it gives rise to an oblique shock wave 52 extending rearwardly therefrom through combustion portion 13 so as to intersect upper wall member 54 defining boundary layer diversion passage 55, the pressure, temperature and Mach number prevailing in flow region 53 behind shock wave 52 being as indicated in Table I.

Hingedly mounted ramp 14 defining the bottom wall of combustion portion 13 is angularly adjustable by means of external control mechanism 60 co-operative with linkage 61 to define a throat in the inlet region of converging-diverging nozzle 80 of appropriate dimensions for maintaining the normal shock wave 62 across which detonation of the fuel-air mixture takes place, the resulting flow conditions in region 63 immediately therebehind being as indicated in Table I.

The formation of shock wave 62, is initiated by structure remote from nozzle 80, as will now be described. Referring back to intake portion 11, the bottom wall 70 thereof includes a hingedly mounted door 71 normally lying flush therewith as shown, but angularly displaceable by means of a suitable control actuator for projection into the induced airflow as indicated by dashed lines 71', the leading edge of the door 71 being adapted to give rise to a normal shock wave, as indicated by dashed line 62' when in the displaced position, and to permit the detachment of said shock wave when moved to the retracted or flush position. Thus, when the aircraft 1 has been accelerated to the desired Mach number at the desired altitude, as for example by means of a jettisonable booster rocket not shown, the door 71 may be momentarily displaced by means of a suitable external control actuator therefor to the position 71', thereby to promote the formation of normal shock wave 62', the door 71 being thereupon returned to its flush position so as to permit the detachment therefrom of the shock wave 62'; thus the door 71 operates as a starting device only, taking no part in the steady state operation of the engine. The detached shock wave 62' is carried by the motion of the induced air so as to move downstream through the duct until it reaches the position 62 where it is retained by the step formed at the trailing edge of hinged ramp 14 and the inlet region of nozzle 80, as hereinbefore described.

Referring to Table I, it will be seen that a stepwise increase in static temperature accompanies each successive shock wave in the aircraft and duct system. To take advantage of this increase in the manner comprehended by the present invention, a fuel having a detonation temperature below the static temperature occurring in the normal shock wave 62 must be selected, an exemplary fuel meeting this condition for the present embodiment of the invention being hydrogen. As shown in Table I, the static temperature occurring in flow region 53 downstream of oblique shock wave 52 may be higher than the temperature required for initiation of combustion in the air-hydrogen mixture, the time required for the mixture to traverse this region being so short, however, in comparison with the time needed to achieve combustion, that the mixture may remain chemically unaffected until it reaches the normal shock wave 62, wherein the static temperature rises abruptly to a value approximately equal to the preceding value of total temperature with consequent detonation of the mixture and a further static temperature increase to 4950°R as shown in Table I. If the operating conditions tend to deviate from those for which the duct and its associated shock wave system are designed, pre-ignition may occur in region 53, and in such event the angular position of hinged ramp 14 may be adjusted so as to increase the Mach number prevailing therein, such an increase in Mach number operating to reduce the static temperature and thus restore the combustion process to the region of the normal shock wave 62 wherein detonation is excited.

Inasmuch as no static temperature equal to or greater than the ignition temperature of hydrogen exists upstream of the shock wave 62 in the steady state operation of the duct system, it will be apparent that the fuel may be introduced into the airflow at any point forward of such steady state position. Accordingly, in the preferred practice of the invention, fuel is introduced into the air flow substantially upstream from the combustion portion 13, thereby to take advantage of the mixing afforded by the system of successive shock waves excited by the several ramps and area changes of the duct system, a suitable arrangement of injection nozzles comprising, for example, a plurality of spaced, vertically aligned members 75 located as shown at the inlet region of intermediate duct portion 11, the members 75 being of suitable cross-sectional shape, for example, symmetrically rhombic, and having discharge orifices provided in the trailing edges thereof. As will be apparent to those skilled in the art, however, numerous other locations for such nozzles may be provided, the operating principles and aerodynamic flow patterns characteristic of the invention making it feasible even to inject fuel upstream of the induction scoop 22 if so desired.

The boundary layer diversion passages, 38, 39, 50 and 55 provided by wall members 33, 34, 51 and 54 serve to mitigate the formation, adjacent the duct walls, of unduly thick boundary layers, such as might tend to choke the airflow, distort the desired shock wave pattern and reduce the operating efficiency of the engine, the induced air, diverted by passages 38 and 39 being directed to auxiliary convergent-divergent nozzles 78 and 79 where it is vented to the exhaust nozzle 15 and merges with the primary flow expanding thereinto through convergent-divergent nozzle 80 provided at the rear of combustion portion 12, the internal contour of the nozzle 15 of the instant embodiment of the invention being formed as shown, sufficient change in flow momentum to develop satisfactory thrust being imparted by virtue of the high velocity of the exhaust gas as shown in Table I.

Though the vehicle shown may be accelerated to the desired operating Mach number by auxiliary means, such as a jettisonable booster, as hereinbefore stated, it will be readily apparent that landing cannot be accomplished safely and satisfactorily at a velocity corresponding to the high Mach number required for steady state operation. For landing the vehicle, therefore, second engine 20 is provided, the intake passage 82 and exhaust passage 83 thereof being integrated with the intermediate portion 12 and exhaust nozzle 15 of the primary engine 10 and connectable in flow communication therewith by means of appropriately hinged doors 84 and 85 operable by means of suitable control actuators of known type, not shown, to open positions as indicated by broken lines 84' and 85' respectively. Thus, when it is desired to land the vehicle, the combustion process in the primary engine 10 may be suspended by interruption of the fuel supply thereto, thereby permitting the vehicle to decelerate under the influence of aerodynamic drag until a speed is attained at which it is safe to open doors 84 and 85 so as to divert a portion of the ducted air flow to the turbo-jet engine 20 to permit starting and operation thereof according to the conventional procedures for such propulsion units, the landing operation then being carried out under the power of engine 20 at such speed as the aerodynamic characteristics of vehicle 1 may require.

It will be apparent to those skilled in the art that while the propulsion method and apparatus of the present invention have been described with reference to operation in a specific airframe, at a specific Mach number and altitude, and with a specific fuel, and with air or ambient atmosphere as a specific oxidant, the utility of the invention is not limited thereto but is adaptable, according to known principles of aero- and thermo-dynamics, to operation in conjunction with a variety of vehicles or other co-operating structure, under a corresponding variety of super- and hypersonic flow conditions, and with a variety of known fuels and atmospheres such as methane and ammonia; in the latter case, of course, the aerodynamic fluid is the fuel, and the oxidant is injected into it for combustion. It is, therefore, anticipated that those skilled in the art will have occasion to practice numerous variations on spe-

We claim:

1. In combination with a vehicle for travel through air at supersonic speed, a reaction propulsion engine comprising: a duct for confining a flow of air, said duct including a forwardly directed inlet portion and a rearwardly directed exhaust portion; means for mixing fuel with said flow of air; constrictive means intermediate said inlet portion and said exhaust portion for retaining a shock wave having a temperature rise thereacross sufficient to cause spontaneous detonation of the mixture of said air and said fuel; and means spaced longitudinally of the vehicle and said duct and operative to create successive oblique shock waves, part of said means being disposed to cause the oblique wave created thereby to engage the duct wall at one side of said constrictive means and being adjustable to vary the effective area of the duct at said restrictive means.

2. In combination with a vehicle for travel through air at supersonic speed, a reaction propulsion engine comprising: a duct for confining a flow of air, said duct including a forwardly directed inlet and a rearwardly directed outlet; nozzle means positioned in said duct downstream of said inlet, said nozzle means being operable to introduce fuel into said flow of air for mixture therewith; and constrictive means positioned in said duct downstream of said nozzle means for retaining a shock wave having a temperature rise thereacross sufficient to cause spontaneous detonation of the mixture of said air and said fuel, and means for generating a detonation-causing shock wave, said means including a ramp to create an oblique shock wave, said ramp being hingedly adjustable about a line of oblique shock wave initiation to vary the effective cross-sectional area of said duct at said constriction where said detonation-causing shock wave is retained.

3. In combination with a vehicle for travel through air at supersonic speed, a reaction propulsion engine comprising: a duct for confining a flow of air, said duct including a forwardly directed inlet and a rearwardly directed outlet; means in said duct downstream of said inlet for mixing fuel with said air; a constricted throat downstream of said mixing means for creating and retaining a normal detonation-causing shock wave in said duct; and means for creating an oblique shock wave upstream of said throat and varying the effective size of said throat, said means providing a ramp disposed to cause an oblique wave to engage the duct wall at one side of said restricted throat in all effective sizes of the latter.

4. In combination with a vehicle for travel through air at supersonic speed, a reaction propulsion engine comprising: means defining an air duct adjoining said vehicle, said duct including a forwardly directed inlet and a rearwardly directed outlet door means disposed in a wall of said duct downstream of said inlet, said door means being hingedly operable from a closed position to an open position to provide an opening in said wall and to constrict the flow area internally of said duct for exciting a normal shock wave therein, and from said open position to said closed position to permit said wave to be propagated downstream of said door; means for introducing fuel into said duct downstream of said inlet for mixture with said air; and a constriction in said duct downstream of said injection means for arresting said normal shock wave and retaining the same in fixed position relative to said duct, thereby to excite detonation of said fuel air mixture in a region upstream of said outlet.

5. In combination with a vehicle for travel through air at supersonic speed, a reaction propulsion engine comprising: means defining an air duct adjoining said vehicle, said duct including a forwardly directed inlet and a rearwardly directed outlet; means upstream of said inlet for exciting a first shock wave positioned for cooperation with said inlet; door means disposed in a wall of said duct downstream of said inlet, said door means being hingedly operable from a closed position to an open position to provide an opening in said wall and to constrict the flow area internally of said duct for exciting a normal shock wave therein, and from said open position to said closed position to permit said wave to be propagated downstream of said door; means for introducing fuel into said duct downstream of said inlet for mixture with said air; and a constriction in said duct downstream of said injection means for arresting said normal shock wave and retaining the same in fixed position relative to said duct, thereby to excite detonation of said fuel air mixture in a region upstream of said outlet.

6. A method for developing propulsive reaction at air speeds in excess of sonic velocity comprising: directing an air flow into a confined channel; mixing fuel with said air flow; exciting successive oblique shock waves in said channel to decrease the Mach number and increase the static pressure and static temperature of the flow therein; removing boundary layer air fron the channel walls adjacent the terminal ends of certain of the oblique shock waves; and exciting a shock wave substantially normal to the axis of said flow at a fixed position in said channel to induce detonation of said fuel-air mixture.

7. In combination with a vehicle for travel through air at supersonic speed, a reaction propulsion engine comprising: a duct for confining a flow of air, said duct including a forwardly directed inlet and a rearwardly directed outlet; means in said duct downstream of said inlet for mixing fuel with said air; means spaced longitudinally of said duct for creating successive oblique shock waves to decrease the Mach number and increase the static pressure and static temperature of the flow in the duct; means disposed in said duct to that required for spontaneous detonation for removing boundary layer air from the duct walls adjacent points of impact of certain oblique shock waves therewith; a constricted throat in said duct downstream of said mixing means for retaining a normal shock wave across which a temperature rise sufficient to cause spontaneous detonation of the mixture of air and fuel occurs; and adjustable means for varying the effective area of said constricted throat.

* * * * *

UNITED STATES PATENT OFFICE
CERTIFICATE OF CORRECTION

Patent No. 3,777,487  Dated December 11, 1973

Inventor(s) Leslie Norman and Skillman C. Hunter

It is certified that error appears in the above-identified patent and that said Letters Patent are hereby corrected as shown below:

Claim 4, line 5, after "outlet" insert --semicolon (;)--.

Claim 6, line 7, change "fron" to --from--.

Claim 7, lines 10 and 11, after "duct" (second occurrence) delete

"to that required for spontaneous detonation";

line 10, after "duct" (first occurrence) insert

--to that required for spontaneous detonation--.

Signed and sealed this 21st day of May 1974.

(SEAL)
Attest:

EDWARD M. FLETCHER, JR.  C. MARSHALL DANN
Attesting Officer  Commissioner of Patents